(12) United States Patent
Bentz et al.

(10) Patent No.: US 11,636,647 B2
(45) Date of Patent: *Apr. 25, 2023

(54) SYSTEM AND METHOD FOR LOCALIZATION OF FLUORESCENT TARGETS IN DEEP TISSUE FOR GUIDING SURGERY

(71) Applicant: Purdue Research Foundation, West Lafayette, IN (US)

(72) Inventors: Brian Zahler Bentz, Albuquerque, NM (US); Kevin J. Webb, West Lafayette, IN (US); Dergan Lin, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 770 days.

This patent is subject to a terminal disclaimer.

(21) Appl. No.: 16/554,188

(22) Filed: Aug. 28, 2019

(65) Prior Publication Data

US 2019/0392633 A1    Dec. 26, 2019

Related U.S. Application Data

(63) Continuation-in-part of application No. 15/975,211, filed on May 9, 2018, now Pat. No. 11,116,445.
(Continued)

(51) Int. Cl.
*G06T 17/00* (2006.01)
*G06T 15/60* (2006.01)
(Continued)

(52) U.S. Cl.
CPC ............ *G06T 17/00* (2013.01); *G06T 7/0012* (2013.01); *G06T 15/50* (2013.01); *G06T 15/60* (2013.01);
(Continued)

(58) Field of Classification Search
CPC ........ G06T 15/50; G06T 15/60; G06T 17/00; G06T 17/20; G06T 2207/10064;
(Continued)

(56) References Cited

U.S. PATENT DOCUMENTS 9,655,523 B2 * 5/2017 Hillman ............... A61B 5/0064
2008/0079802 A1 * 4/2008 Nilson ................. G01N 21/763
348/44

(Continued)

OTHER PUBLICATIONS

Gibson et al., Recent advances in diffuse optical imaging, 2005, Phys. Med. Biol. 50, R1.
(Continued)

*Primary Examiner* — Angela M Hoffa
*Assistant Examiner* — Maria Christina Talty
(74) *Attorney, Agent, or Firm* — Piroozi-IP, LLC

(57) ABSTRACT

A method for identifying a source of florescence is disclosed which includes shining light on a subject at a first wavelength, causing emission of light at a second wavelength from the source of fluorescence, filtering out light at the first wavelength, capturing at least one 2 dimensional (2D) image of a subject having a plurality of pixels at the second wavelength, and establishing information about approximate location of a source of florescence within a tissue of the subject, selectively generating a 3D geometric model where the model is adapted to provide a model representation of the at least one 2D captured image, comparing the modeled at least one 2D captured image to the captured at least one 2D image and iteratively adjusting the model to minimize the difference, and outputting location and geometric configuration of the source of fluorescence within the tissue within the region of interest.

20 Claims, 7 Drawing Sheets
(4 of 7 Drawing Sheet(s) Filed in Color)

Related U.S. Application Data

(60) Provisional application No. 62/723,907, filed on Aug. 28, 2018.

(51) Int. Cl.
*G06T 15/50* (2011.01)
*G06T 7/00* (2017.01)

(52) U.S. Cl.
CPC .............. *G06T 2207/10064* (2013.01); *G06T 2207/10101* (2013.01); *G06T 2207/30096* (2013.01); *G06T 2210/41* (2013.01)

(58) Field of Classification Search
CPC . G06T 2207/10101; G06T 2207/30096; G06T 2210/41; G06T 7/0012
See application file for complete search history.

(56) References Cited

U.S. PATENT DOCUMENTS

| | | | |
|---|---|---|---|
| 2017/0003491 A1* | 1/2017 | Waller | G06T 7/0016 |
| 2018/0110414 A1* | 4/2018 | Kishima | G06T 11/003 |
| 2018/0177401 A1* | 6/2018 | Yang | G01N 21/6458 |
| 2018/0270474 A1* | 9/2018 | Liu | A61B 6/508 |

OTHER PUBLICATIONS

Arridge, Optical tomography in medical imaging, 1999, Inverse Prob. 15, R41-R93.

Ye et al., Optical diffusion tomography using iterative coordinate descent optimization in a Bayesian framework, 1999, J. Opt. Soc. Am. A 16, 2400-2412.

Milstein et al., Statistical approach for detection and localization of a fluorescing mouse tumor in Intralipid, 2005, Appl. Opt. 44, 2300-2310.

Gaind et al., Localization of an absorbing inhomogeneity in a scattering medium in a statistical framework, 2007, Opt. Lett. 32, 3026-3028.

Webb et al., Modified distorted Born iterative method with an approximate Frechet derivative for optical diffusion tomography, 1999, J. Opt. Soc. Am. A 16, 1814-1826.

Schweiger et al., The Toast++ software suite for forwardand inverse modeling in optical tomography, 2014, J. Biomed. Opt. 19,040801-040801.

Tsai et al., In vivo mouse fluorescence imaging for folate-targeted delivery and release kinetics, 2014, Biomed. Opt. Exp. 5, 2662-2678.

Van Dam et al., Intraoperative tumor-specific fluorescence imaging in ovarian cancer by folate receptor-α targeting: first in-human results, 2011, Nature Med. 17, 1315.

* cited by examiner

SYSTEM AND METHOD FOR LOCALIZATION OF FLUORESCENT TARGETS IN DEEP TISSUE FOR GUIDING SURGERY

CROSS-REFERENCE TO RELATED APPLICATIONS

The present patent application is a continuation-in-part application which is related to and claims the priority benefit of U.S. Non-Provisional patent application Ser. No. 15/975, 211, filed May 9, 2018, published as US 2018/0325449, and is also related to and claims the priority benefit of U.S. Provisional Patent Application Ser. No. 62/723,907 filed Aug. 28, 2018, the contents of each of which are hereby incorporated by reference in its entirety into the present disclosure.

STATEMENT REGARDING GOVERNMENT FUNDING

This invention was made with government support under CA182235-01A1 awarded by the National Institutes of Health. The government has certain rights in the invention.

TECHNICAL FIELD

The present disclosure generally relates to detecting specific tissue, and in particular, to a system and method of localization of fluorescent targets in deep tissue for guiding surgery.

BACKGROUND

This section introduces aspects that may help facilitate a better understanding of the disclosure. Accordingly, these statements are to be read in this light and are not to be understood as admissions about what is or is not prior art.

There is substantial interest in imaging deep tissue because it enables studies of targeted biochemical processes in natural environments and in vivo. However, when light is shown on a tissue, it both scatters and is absorbed, thereby making use of light transmitted through tissue exceedingly difficult. In addition, selective imaging requires reactance of tissue of interest to be different than surrounding tissue. As such, many have investigated fluorescent imaging. This type of imaging requires selective uptake of a florescent agent by a tissue of interest, exciting the tissue which causes the florescent agent to fluoresce, and detecting the fluorescence. However, such imaging presents a major challenge because the light becomes highly scattered, limiting the information that can be extracted from measurements. Near the tissue surface, microscopy methods such as optical coherence tomography and two-photon microscopy allow imaging at high resolution but with limited depth. Even with feedback control of the amplitude and phase of the incident wavefront, which enables focusing of light through tissue, the imaging depth is limited to less than about 1 mm.

In a surgical setting, it will be useful to assist the surgeon with information of exact location and size of a tissue to be resected. However, none of the above-mentioned techniques can provide information at a depth into tissue that is useful in most surgical settings.

Therefore, there is an unmet need for a novel approach to image at greater depths tissues to be resected and use such images in assisting with surgical operations.

SUMMARY

A system for identifying a source of florescence is disclosed. The system includes a source of light configured to be shone on a subject, the light source configured to illuminate tissue of a subject at a first wavelength, and in response cause emission of light at a second wavelength from the tissue. The system also includes an optical filter configured to filter out light having the first wavelength and allow passage of light having the second wavelength. Furthermore, the system includes a method to measure light, such as an image capture device configured to capture images of the tissue at the second wavelength. In addition, the system includes a processor having software encoded on a non-transitory computer readable medium. The processor and the software are adapted to capture at least one 2 dimensional (2D) image of a subject having a plurality of pixels, establish information about approximate location of a source of fluorescence within tissue of the subject, identify a region of interest about the approximate location the source of florescence, establish a 3D topography data of the subject at least about the region of interest, map each pixel of the region of interest of the at least one 2D image to the 3D topography data, selectively generate a 3D geometric model based on physical properties of light propagation through the tissue based on the 3D topography data including a plurality of parameters defining the model, the model adapted to provide a model representation of the at least one 2D captured image, compare the modeled at least one 2D captured image to the captured at least one 2D image and generate an error signal representing a difference therebetween, iteratively adjust the plurality of parameter of the model to minimize the error signal, and output location and geometric configuration of the source of florescence within the tissue within the region of interest.

A method for identifying a source of florescence is also disclosed. The method includes shining light on a subject by a light source at a first wavelength, causing emission of light at a second wavelength from a source of florescence, filtering out light at the first wavelength and allowing passage of light at the second wavelength, capturing at least one 2 dimensional (2D) image of a subject having a plurality of pixels at the second wavelength, and establishing information about approximate location of the source of florescence within a tissue of the subject. The method also includes identifying a region of interest about the approximate location the source of florescence, establishing a 3D topography data of the subject at least about the region of interest, and mapping each pixel of the region of interest of the at least one 2D image to the 3D topography data. Furthermore, the method includes selectively generating a 3D geometric model based on physical properties of light propagation through the tissue based on the 3D topography data including a plurality of parameters defining the model, the model adapted to provide a model representation of the at least one 2D captured image. The method also includes comparing the modeled at least one 2D captured image to the captured at least 2D image and generate an error signal representing a difference therebetween. The method also includes iteratively adjusting the plurality of parameter of the model to minimize the error signal; and outputting location and geometric configuration of the source of florescence within the tissue within the region of interest.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 5A shows one of the 92 images from the scanning, combination of all the scans are shown forming the 3D mouse topography, and where FIG. 5C shows a fluorescence image of the mouse captured by the CCD camera through the filter.

FIGS. 6A and 6B show plots of nodes from a Cartesian grid within thin slices at y=17 mm and z=9 mm, respectively, and where FIG. 6C shows a plot of the node boundary obtained using the 3D topography laser line scan and the estimated location of the source of florescence, and where FIG. 6D, a numerical representation of FIG. 6C is provided.

DETAILED DESCRIPTION

Figure 1:
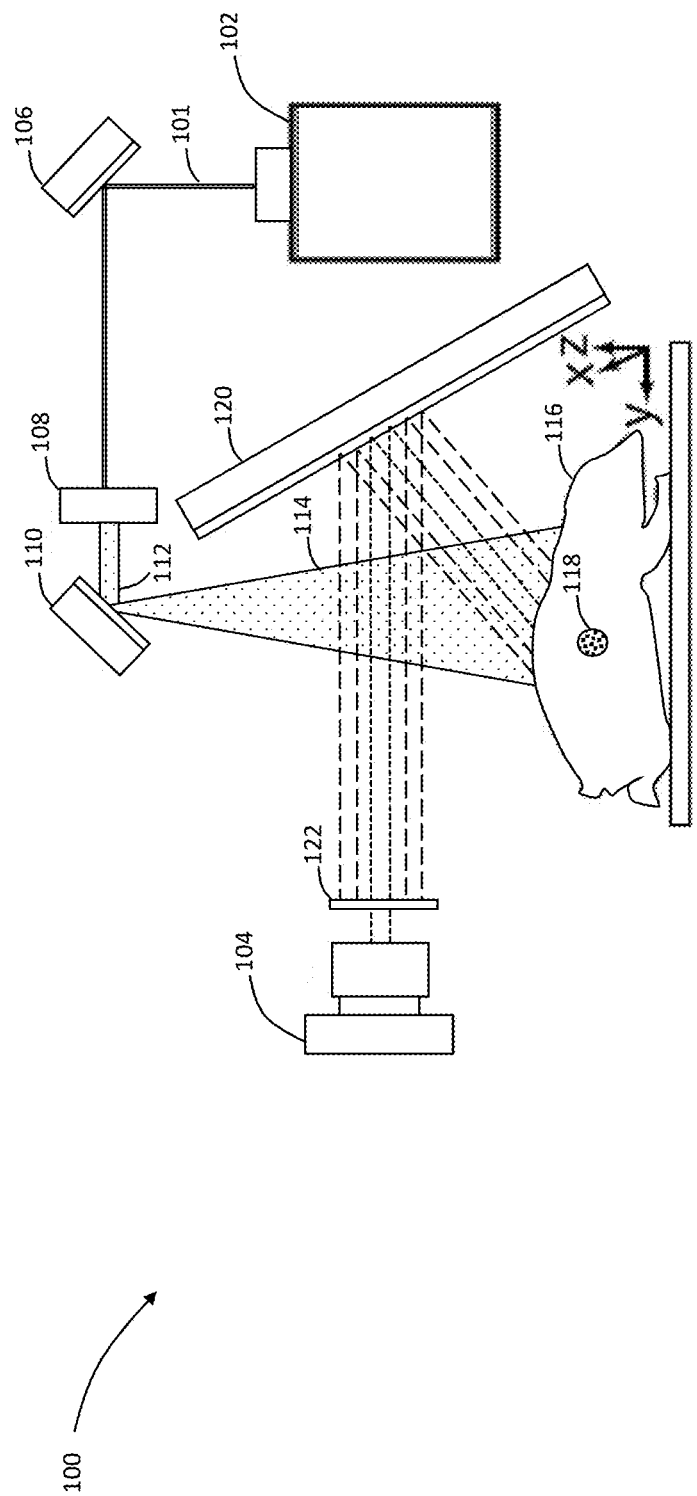
FIG. 1 is a schematic of a deep-tissue imaging system, according to the present disclosure, for identifying a source of florescence beyond a depth of at least 1 mm into a tissue, including a light source, an image capture device, and an optical filter.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel imaging approach is provided in the present disclosure that can be used to assist a surgeon to resect tissue. In particular, imaging beyond 1 mm is desirable. Imaging at tissue depths beyond 1 mm is achievable with diffuse optical imaging (DOI), where the light propagation is approximated as a diffusion process. The diffusion process includes both light scattering as well as absorption. In fluorescence diffuse optical tomography (FDOT), a DOI method, computational imaging allows formation of three dimensional (3D) images of optical properties. FDOT provides utility for in vivo studies in mice and rats, especially when combined with another imaging modality such as computed tomography (CT) or magnetic resonance imaging (MRI) to improve spatial resolution.

FDOT and folate-targeted fluorescent contrast agents can be used to image the kidneys and liver in dead mice as well as tumors in live mice. FDOT has potential to be a useful tool for fluorescence guided surgery, where tumor nodules are identified for a surgeon to remove. However, the full volumetric reconstruction performed by FDOT requires extensive computational time, making it ill-suited for an intraoperative environment where real-time imaging is required over a period of hours. As a result, an alternative approach using fast localization methods is provided in the present disclosure where only the position of a source of florescence is determined. A mouse model is used to show that this method can find tumors in deep tissue, and can provide depth information to assist in guided surgery.

Referring to FIG. 1, a deep-tissue imaging system 100 is shown, according to the present disclosure. The imaging system 100 includes a light source 102 and a detector 104. The detector 104 is an image capture device, e.g., a charge coupled device (CCD) or a plurality of photodiodes. The light source can be a laser configured to emit light 101 at a wavelength of interest. Light 101 is redirected by a mirror 106 which is then incident on spreader 108. The spreader 108 or beam expander spreads the collimated light 101 into a broad-area illumination 112 that is incident on a mirror 110 and reflected in a cone of light 114 onto to a subject, in this case a mouse 116. The mouse 116 has a tumor 118 deep within tissue. Light 114 is scattered and diffused into the tissue of the mouse 116. The tumor 118 is pretreated with a fluorophore such that diffused light reaching the tumor 118 excites the fluorophore such that light of a different known wavelength is emitted. The emitted fluoresced light along with light scattered from the mouse 116 are incident on a mirror 120 and reflected onto a filter 122 that filters out non-fluorescent wavelength light and only allows the fluoresced light through and onto the detector 104.

The detector 104 is coupled to a processor (not shown) which has analyzing software on a non-transitory computer readable medium configured to determine the characteristics of the tumor 118 (or other tissue that has been treated with a florescent material). The analysis is based on a process 200 depicted as a flowchart in FIG. 2.

Figure 2:
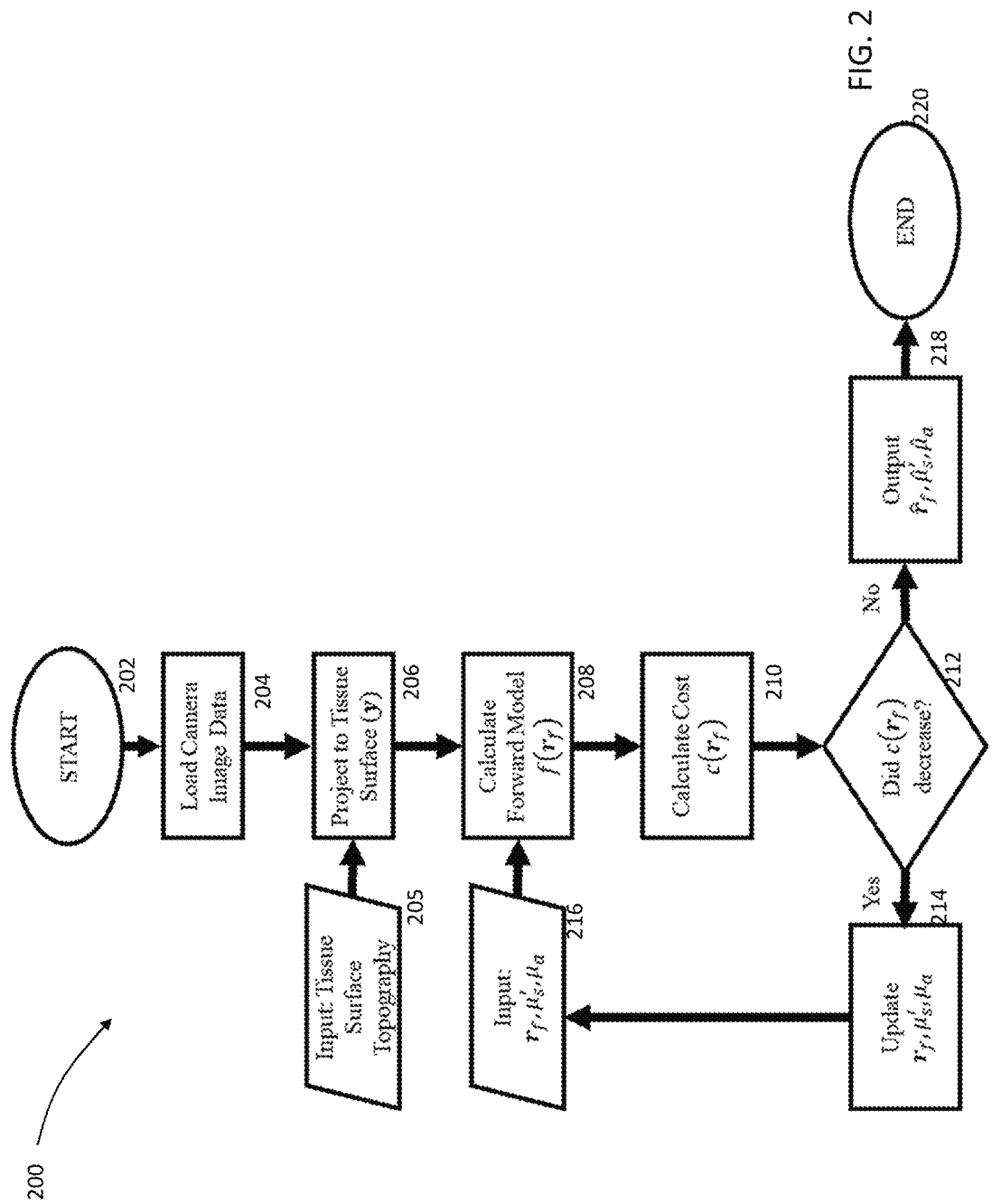
FIG. 2 is a flowchart describing the steps of a processor adapted to analyze data associated with the source of florescence.

Prior to describing the steps in the process 200 shown in FIG. 2, a discussion of a diffusion model for describing light transport in highly scattering media is provided. In the presence of fluorescence, two coupled diffusion equations can be used to model the propagation of photons at the fluorophore excitation wavelength, $\lambda_x$ (i.e., the wavelength of light that causes excitation of the fluorophore), and the fluorophore emission wavelength, $\lambda_m$ (i.e., the wavelength at which the fluorophore emits light once excited). For exp $(j\omega t)$ time variation, the coupled diffusion equations are $$\nabla \cdot [D_x(r)\nabla \phi_x(r, \omega)] - \left[\mu_a(r) + \frac{j\omega}{c}\right]\phi_x(r, \omega) = -S_x(r; \omega), \quad (1)$$

$$\nabla \cdot [D_m(r)\nabla \phi_m(r, \omega)] - \left[\mu_a(r) + \frac{j\omega}{c}\right]\phi_m(r, \omega) = -\phi_x(r, \omega)S_f(r; \omega), \quad (2)$$

where r denotes the position,
$\phi(r, \omega)$ (W/mm$^2$) is the photon flux density,
$\omega$ is the angular modulation frequency,
$D=1/[3(\mu_s'+\mu_a)]$ (mm) is the diffusion coefficient,
$\mu_s'$ (mm) is the reduced scattering coefficient,
$\mu_a$ (mm) is the absorption coefficient,
c is the speed of light in the medium,
the subscripts x and m denote parameters at the fluorophore excitation and emission wavelengths, $\lambda_x$ and $\lambda_m$, respectively,
$S_x$ (W/mm$^3$) is the excitation source term, and
$S_f=\eta(1+j\omega\tau)^{-1}$ (mm$^{-1}$) is the fluorescence source term.

Equations (1) and (2) are coupled through the $\phi_x(r, \omega)$ term on the right hand side of (2). These equations represent a set of partial differential equations (PDE), that can be solved numerically using the Green's function, as known to a person having ordinary skill in the art. In an infinite homogeneous space, the diffusion equation's Green's function is $$g(r, r') = \frac{e^{-jk|r-r'|}}{4\pi|r-r'|}, \quad (3)$$

where r' is the position of a point source, and $k^2 = -\mu_a D - j\omega/(Dc)$, where $\mu_a$ and $D$ can be calculated at $\lambda_x$ or $\lambda_m$ in (1) or (2), respectively. Equation (3) represents the analytical solution of propagation of photons.

Based on equations (1), (2), and (3), a model can thus be generated based on the assumption that tissue surrounding the tumor is homogenous and thus diffuses light uniformly. Equations (1) and (2) can be solved on an unstructured finite element method (FEM) mesh on the assumption that the tissue is heterogeneous. However, the FEM solution requires extensive computational time, limiting its application in an operating environment. For this reason, a closed-form analytic solution can be adopted that allows fast computation.

Figure 3:
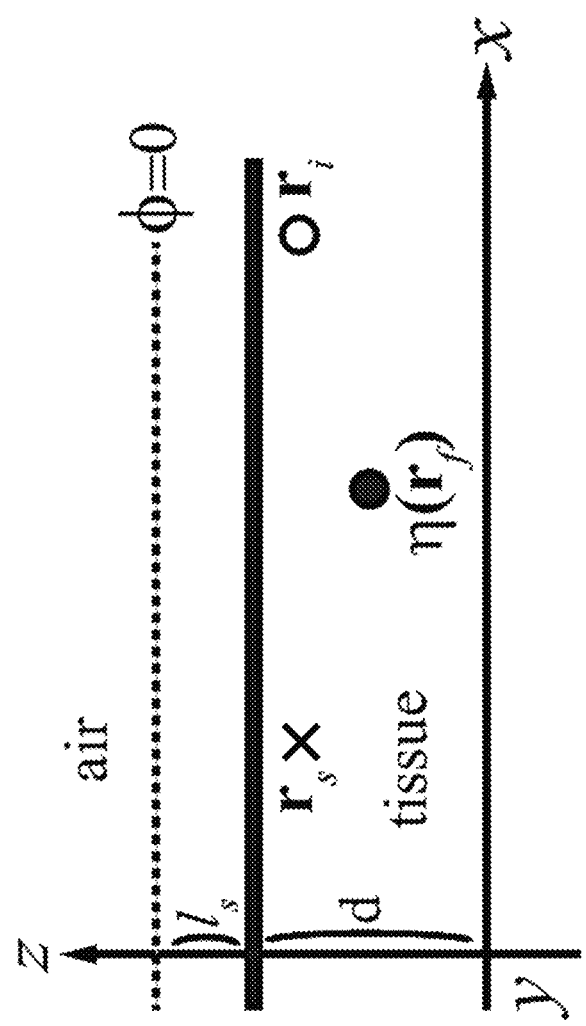
FIG. 3 is a graphical representation of a geometry relevant to the imaging system of the present disclosure.

Referring to FIG. 3, a schematic of a geometry relevant to the imaging system of the present disclosure is shown. FIG. 3 represent model geometry for a single tissue boundary, where r=(x,y,z) with the y-axis is going into the page. The thickness of the tissue, denoted as d, is assumed to be large such that the diffusion model holds. An excitation source (X) at $r_s$ and a fluorescence emission detector (O) at $r_i$ are placed one scattering length $l^* = 3D$ away from the tissue boundary. A source of florescence (•) is at an unknown position $r_f$. To simulate semi-infinite planar geometry, a zero flux ($\varphi=0$) boundary conditions is used with $l_s=0.503D$. In addition, it is assume that a laser excitation point source is located at $r_s$, giving $S_x(r,\omega)=S_o\delta(r-r_s)$, where $S_o$ is the laser excitation power density (W/mm$^2$) and $\delta$ is the Dirac delta function. It is also assumed that N point detectors at $\lambda_m$ are located at positions $r_i$, where i is an index form 1 to N. It is also assumed that a single fluorescence point source is located at $r_f$, such that $S_f(r, \omega) = \eta_f \mu_{a_f} \delta(r-r_s)$, where $\eta_f$ and $\mu_{a_f}$ are the quantum yield and absorption of the fluorophore, respectively. Localization of the tumor means to estimate $r_f$. The $i^{th}$ forward model solution $\hat{f}_i$ of the fluorescence emission measured at $r_i$ is then:

$$\hat{f}_i(r_f) = w[g_m(r_f, r_i) g_x(r_s, r_f)], \quad (4)$$
$$= w f_i(r_f), \quad (5)$$

where w is a multiplicative constant that incorporates $\eta_f$, $\mu_{a_f}$, $S_o$, and the efficiency of light coupling into the medium, $g_x(r_s, r_f)$ represent the diffusion equation Green's function for (1) at $\lambda_x$, and
$g_m(r_f, r_i)$ represent the diffusion equation Green's function for (2) at $\lambda_m$. The Green's functions are derived by assuming a single boundary exists such that $r_s$ and $r_i$ are on the boundary and $r_f$ is below the boundary, as shown in FIG. 3. An extrapolated zero flux boundary condition is enforced using image sources. Analytic expressions for $g_x(r_s, r_f)$ and $g_m(r_f, r_i)$ are found using (3) and summing the contributions of the sources. It should be noted that $f_i(r_f)$ depends nonlinearly on $r_f$.

If a source of florescence is present, its position can be estimated by finding the value of $r_f$ that minimizes the cost function $$c(r_f) = \min_w \|y - wf(r_f)\|^2_{\gamma^{-1}}, \quad (6)$$

where y is a vector of N measurements,
f ($r_f$) is a vector of N forward calculations $f_i(r_f)$ from (5), $\gamma = \alpha \text{diag}[|y_1|, \ldots, |y_N|]$ is the noise covariance matrix, for which we assume a shot noise model characterized by $\alpha$. For an arbitrary vector v, $\|v\|^2_{\gamma^{-1}} = v^H \gamma^{-1} v$,
where H denotes the Hermitian transpose. Only the case where a single excitation source is present at position $r_s$ is considered. In this case, $g_x(r_s, r_f)$ at $r_f$ is constant, and can therefore be pulled out of f ($r_f$), giving $$c(r_f) = \min_w \|y - wg_x(r_s, r_f)h(r_f)\|^2_{\gamma^{-1}}, \quad (7)$$

where $h_i(r_f) = g_m(r_f, r_i)$ is the $i^{th}$ component of $h(r_f)$. Because $g_x(r_s, r_f)$ is a constant at $r_f$, it can be incorporated into w as $$c(r_f) = \min_{w_s} \|y - w_s h(r_f)\|^2_{\gamma^{-1}}, \quad (8)$$

For localization, one goal is to find the $r_f$ that minimizes (8), and we note that the inverse problem is linear in $w_s$ and nonlinear in $r_f$. Equation (8) can therefore be minimized using a two-step procedure. First, we set the derivative of $\|y - w_s h(r_f)\|^2_{\gamma^{-1}}$ with respect to $w_s$ equal to zero and solve for $w_s$, resulting in $$\widetilde{w_s}(r_f) = \frac{h^T(r_f)\gamma^{-1} y}{h^T(r_f)\gamma^{-1} h(r_f)}, \quad (9)$$

$$c(r_f) = \min_{w_s} \|y - \widetilde{w_s}(r_f) h(r_f)\|^2_{\gamma^{-1}}, \quad (10)$$

Second, we calculate (10) at a set of positions $r_f$ within a region of interest that encompasses the true location. The maximum likelihood estimates are then $$\widetilde{r_f} = \arg\min_{r_f} c(r_f), \quad (11)$$

$$\widetilde{w_s} = \widetilde{w_s}(\widetilde{r_f}), \quad (12)$$

An important step in our derivation that differentiates it from previous derivations is the incorporation of $g_x(r_s, r_f)$ into $w_s$. This step implies that the inverse problem can be solved without consideration or modeling of the excitation source, and only $g_m(r_f, r_i)$ needs to be computed for the forward model. This is of great utility because complicated illumination patterns (such as an expanded beam) do not need to be modeled.

Figure 4B:
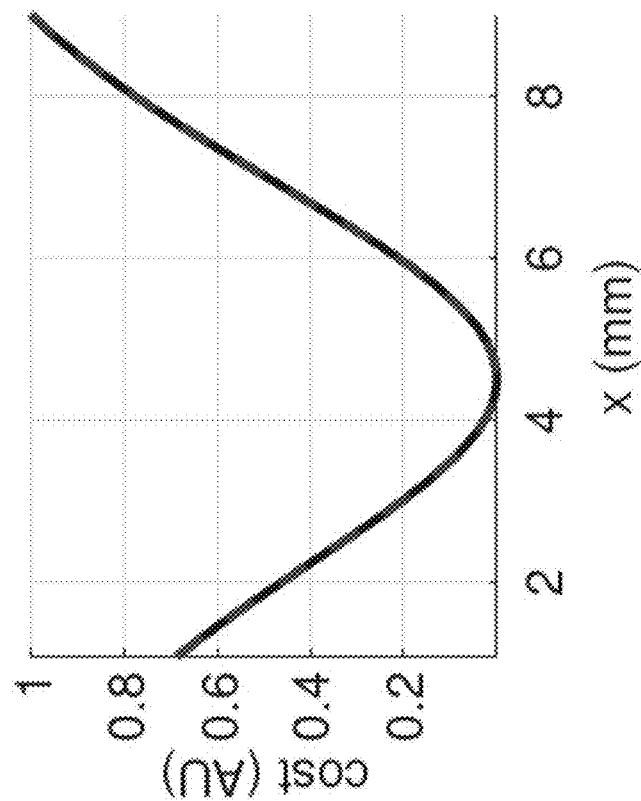
FIGS. 4A and 4B are graphs that demonstrate numerically localization of a source of florescence, according to the present disclosure.
Figure 4A:
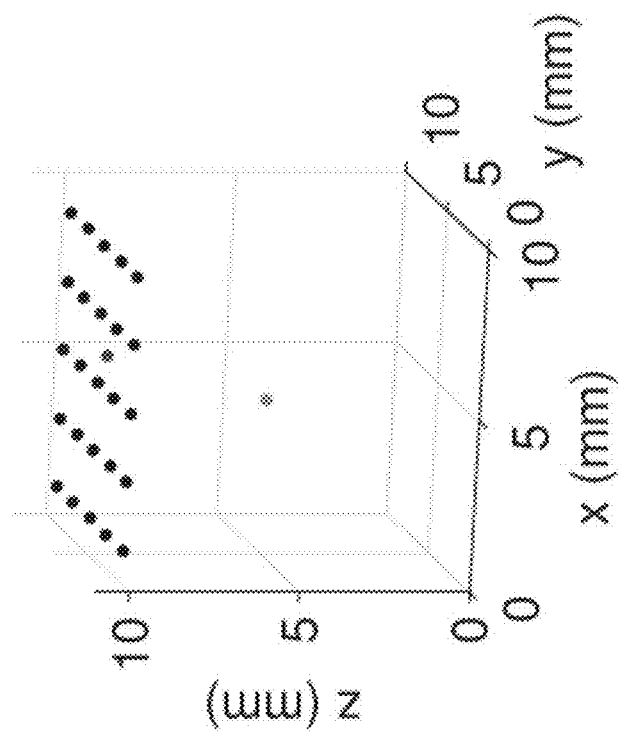

The localization of a source of florescence can thus be demonstrated numerically, according to the present disclosure, in FIGS. 4A-4B. FIG. 4A shows the simulation geometry, where 25 detectors (blue) and 1 excitation source (red) are placed at the z=10 mm plane, and a fluorescent point source (green) is located at $r_f$=(4.5, 5.0, 5.0) mm. Simulated measurement data y was generated using (5) (which included calculation of $g_x(r_s, r_f)$) and adding shot noise with an assumed 30 dB SNR. The 10 mm×10 mm×10 mm volume below the detectors was defined as the region of interest and discretized into a Cartesian grid. Equation (10) was then calculated at each grid point, and the grid point with the minimum cost is $\widehat{r_f}$, according to (11). FIG. 4B plots the normalized cost as a function of position within the region of interest with both y and z fixed at their true value (5 mm). The dashed red line in FIG. 4B is the cost as calculated using (6), and the blue line is the cost as calculated using (10). We see that both cost functions are the same after being normalized to their maximum, demonstrating that $g_x(r_s, r_f)$ can be incorporated into the constant $w_s$ and does not need to be calculated for the inversion. Both cost functions have a single minimum at the same value of x=4.52 mm.

To demonstrate the efficacy of the process 200 (see FIG. 2), an experiment was conducted relative to the setup shown in FIG. 1. Laser excitation light at λ_x is reflected through the beam expander 108 onto the surface of the subject (shown in FIG. 1 as a mouse). A microscope objective was used with a short focal length as the beam expander. The output of a pulsed supercontinuum source (EXR-20 NKT PHOTONICS, 5 ps seed pulse width, 20 MHz repetition rate) is filtered by a tunable filter 122 (e.g., a VARIA filter produced by NKT PHOTONICS) to generate excitation light at a desired wavelength and bandwidth. With a typical 10 nm bandwidth, the average power is about 15 mW. Light at λ_m is emitted from fluorophores in deep tissue (green circle), reflected from a mirror, and detected by a CCD camera (PIMAX®, 512×512 pixels) through an emission bandpass filter centered at λ_m. A f/2.8 camera lens (AF micro Nikkor, NIKON®) was focused to the surface of the subject. All measurements were pseudo-CW, where the CCD camera integration time was much longer than the inverse of the pulsed laser repetition rate (50 ns). A 3D topography laser line scanner (not shown in FIG. 1) was employed to obtain the 3D profile of the subject. The 3D profile was used to determine the detector positions by projecting the CCD camera pixels to the subject's surface. The 3D topography scanner was controlled using a 150 mm motorized linear stage (ZABER™ T-LSM150A-KT04U).

In order to localize a tumor, tumor cells need to be first targeted with a fluorescent compound. Over forty percent of human cancer cells over-express folate receptors, enabling the cells to be identified using folate-targeted fluorescence imaging. In a typical study, a fluorophore is attached to the targeting agent (folate) and injected into the blood stream of an animal. The fluorescent agent is then distributed to the extracellular extravascular space, where it remains in circulation or is eliminated. Roughly 30 minutes after injection, the fluorescent agent is mostly cleared from the blood, and is concentrated in the kidneys, the liver, and any tumors that are present. This process introduces a contrast in fluorescence throughout the tissue, enabling fluorescence-guided surgery. In a previous study, it was shown that a surgeon can detect 5 times more malignant masses with the aid of fluorescence than with the naked eye. However, once a tumor has been identified, additional information about its location, such as its depth, could be used to minimize damage to the surrounding healthy tissue. Here, we use a mouse model to demonstrate that the location of a tumor can be estimated using our localization method. Expanded beam illumination is commonly used in fluorescence-guided surgery, further motivating the use of our approach.

Female nu/nu mice purchased from NCI CHARLES RIVER LABORATORIES™ were maintained on folate deficient rodent chow for 3 weeks prior to experimental study and kept on a standard 12 hour light-dark cycle. Tumor cells (106 of L1210A) were injected intravenously into the tail vein of a six-week-old female nu/nu mouse. The cancer cells were allowed to metastasize for 30 days, at which point 10 nmol of a folate-targeted fluorescent agent (OTL0038) dissolved in saline was injected intravenously via the tail vain. The OTL0038 attached itself to the folate-receptors present in the tumors, allowing for fluorescent imaging. Two hours after injection of OTL0038, the mouse was euthanized through $CO_2$ asphyxiation. The mouse was then placed on its side in the experimental setup shown in FIG. 1.

The peak excitation of the OTL0038 is 770 nm and the peak emission is 790 nm. An OD4 emission bandpass filter (see filter 122 in FIG. 1) with a center wavelength of 780 nm and a 10 nm bandwidth (Andover—780FS10-50) was placed in front of the CCD camera in order to measure the fluorescence emission. The wavelength of the expanded-beam excitation light from the EXR-20 was tuned by the VARIA until peak emission and low filter bleed through were observed. This procedure resulted in an excitation wavelength of 740 nm with a 10 nm bandwidth.

Figure 5C:
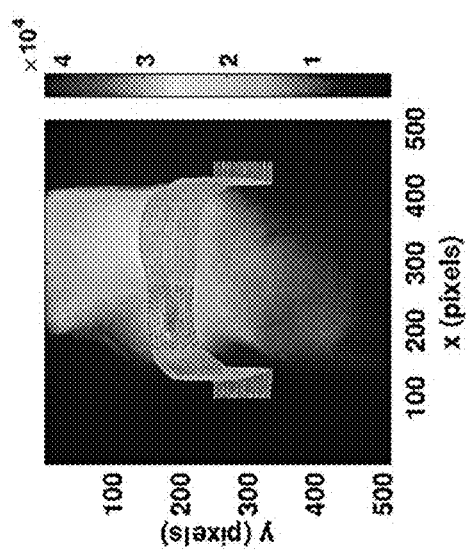
FIGS. 5A, 5B, and 5C show 3D topography of the mouse shown in FIG. 1, using a laser line scanner, where
Figure 5B:
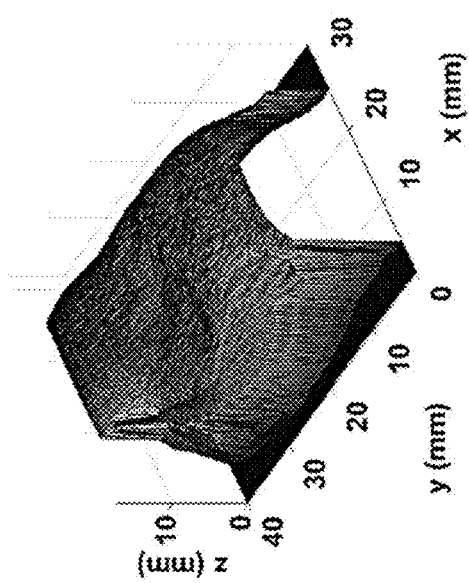
Figure 5A:
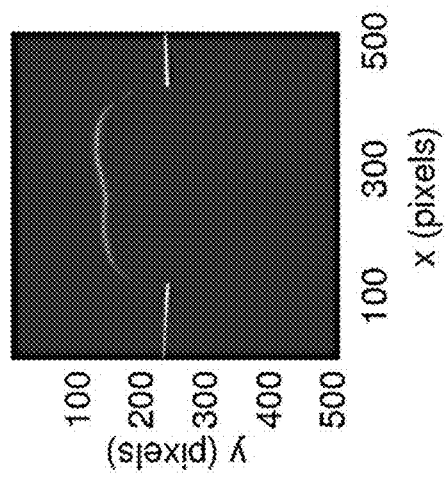

The 3D topography of the mouse was captured using the laser line scanner. Laser light was focused through a cylindrical lens to form a line, which was scanned along the length of the mouse to 92 positions. At each position, a CCD camera image was captured. FIG. 5A shows one of these 92 images. The line scans were combined and calibrated using the corresponding scans of a half-cylinder in order to form the 3D mouse topography as shown in FIG. 5B. This 3D topography was used to determine the positions of CCD pixels on the surface of the mouse, giving $r_i$. FIG. 5C shows a fluorescence image of the mouse captured by the CCD camera through the bandpass filter. Strong fluorescence (in red below the red dots) from a tumor is visible, as well as fluorescence from the kidney (yellow, to the right of the red dots) and some tissue autofluorescence (cyan). Overlaid on FIG. 5C are 144 detectors (red points) that were chosen in the region above a tumor, as well as the line scans used to determine the positions of the detectors (green lines). The values are shown by the colorbar (AU) at these 144 detectors form the data vector y. Equation (11) was used to localize the tumor.

Localization of the tumor requires that the $\mu_s'$ and $\mu_a$ of the tissue are known so that $g_m(r_f, r_i)$ can be calculated using (3) subject to the boundary condition. The $\mu_s'$ and $\mu_a$ can be determined from the literature, or they can be estimated by incorporating them into the optimization problem. $\mu_a$ was estimated according to the present disclosure in order to improve the accuracy of the localization. This was accomplished by fixing $\mu_s'$=1.6 $mm^{-1}$ and, for each $r_f$ within the region of interest, calculating the cost in (10) for values of $\mu_a$ between 0 and 0.05 $mm^{-1}$ separated by increments of 0.005 $mm^{-1}$. The position of the source of florescence was then estimated as the position $r_f$ that minimized the cost. Because the tissue is heterogeneous and the model assumes that it is homogeneous, estimated values of $\mu_s'$ and $\mu_a$ will not be quantitative. Therefore, $\mu_s'$ and $\mu_a$ can be treated as fitting parameters, since for localization only position of the source of florescence is of interest.

Figure 6B:
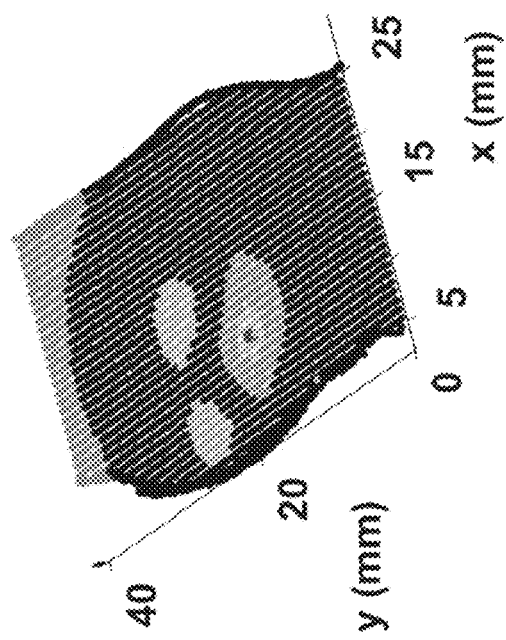
FIGS. 6A, 6B, 6C, and 6D are plots that show the results of the localization procedure of a source of florescence using data from FIGS. 5A-5C, where
Figure 6A:
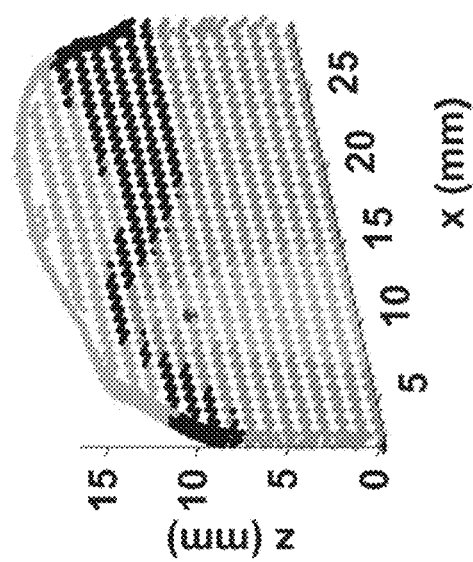
Figure 6C:
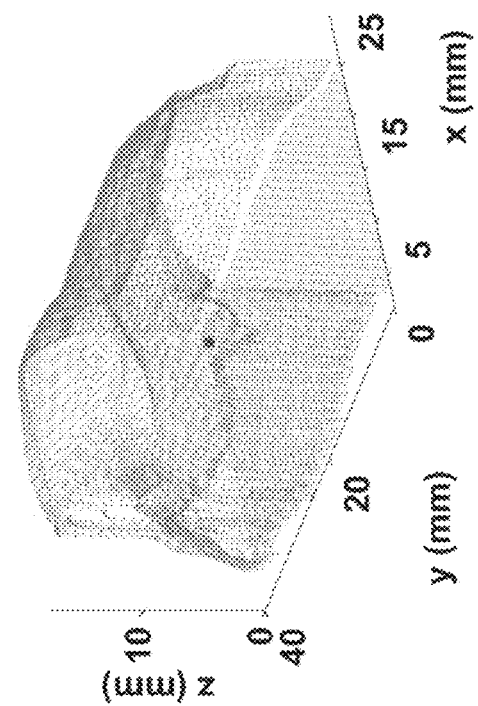
Figure 6D:
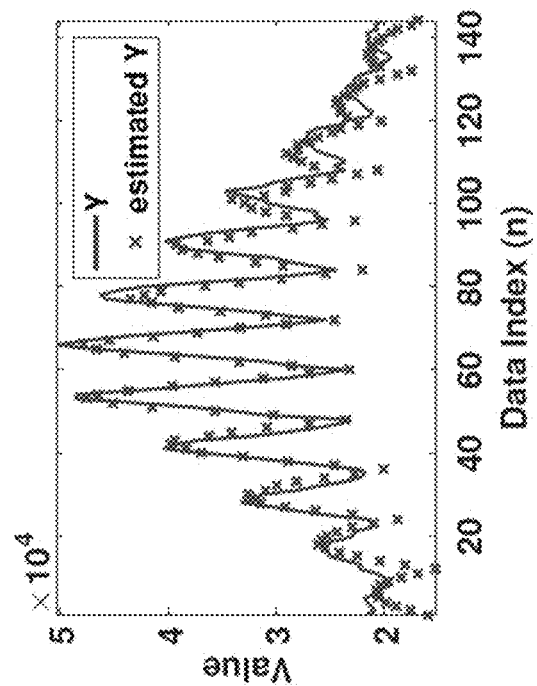

The results of this localization procedure using data from FIGS. 5A-5C are presented in FIGS. 6A-6D. The region of interest was defined as a Cartesian grid confined by the mouse 3D topography of FIG. 5B. The position that minimized the cost, or the estimated position of the tumor, was (11.1, 17.0, 9.0) mm. FIGS. 6A and 6B show plots of nodes from the Cartesian grid within thin slices at y=17 mm and z=9 mm, respectively, where the estimated node position of the tumor is plotted as the red point. Each node is plotted as a different color that depends on the cost calculated at that position, with $\mu_a$ fixed at the value that minimized the overall cost. Yellow, green, blue, and cyan nodes have costs above the minimum cost, 0.05 of the maximum cost, 0.2 of the maximum cost, and 0.4 of the maximum cost, respectively. FIG. 6C shows a plot of the node boundary obtained using the 3D topography laser line scan and the estimated tumor location. The depth of the tumor was estimated to be about 6.4 mm. In FIG. 6D, the measured data vector y from FIG. 5C is plotted with the estimated y, or $\hat{y} = \widehat{w_s} h(\widehat{r_f})$. Since the surface is slowly varying, and only one source of florescence dominates the contribution to the data at the detectors, the model fits the data well. The discrepancy could be due to autofluorescence, fluorescence from the kidney, errors in the 3D topography, or assumptions made in the forward model derivation.

The localization method was implemented in MATLAB® and run on a 12 core computer with 3.47 GHz INTEL® X5690 processors and 96 GB RAM. In order to improve the computational time, an effort was made to parallelize the computation of the cost function across multiple processors using the MATLAB® parallel computing toolbox. Without parallel processing, the computational time for the results in FIGS. 6A-6D was 30.9 minutes. With parallel processing, the computational time was reduced to 3.3 minutes, which is much more manageable for applications in surgery. The computational time could be further reduced, for example, by decreasing the number of nodes within the region of interest or reducing the number of detectors.

Referring to FIG. 2, the process 200 starts out at the start block 202 and proceeds to loading camera image data, block 204. This data represents the filtered (i.e., fluoresced light emitted from a source of florescence in tissue allowed to pass through the filter 122 (see FIG. 1)). This step represents capture of at least one 2 dimensional (2D) image of a subject having a plurality of pixels. Next a 3D topography data of the subject is established as shown in block 205. This topography data is established by one of many approaches known to a person having ordinary skill in the art. For example, laser scanning of the subject can be used to establish the 3D topography data. Another example is a stereoscopic approach using stereo cameras. The 3D topography data is fed to the processor which maps the 2D image at least about the region of interest to the 3D topography data. This is done in block 206. Next in block 208 a forward model solution is generated. The model is a mathematical model representing physical properties of light propagation through the tissue based on the 3D topography data including a plurality of parameters defining the model. The model is adapted to provide a model representation of the at least one 2D captured image. Next in block 210 a cost function is calculated based on comparison of the modeled at least one 2D captured image to the actual captured of the at least 2D image. The cost function represents an error signal representing a difference therebetween. In the decision block 212 the cost function is compared to the last iteration; if the cost decreased (i.e., still not at the minimum), then the parameters of the model (rf, $\mu_s'$, and $\mu_a$) are updated in block 214 and provided to the model as updates in block 216. Otherwise (i.e., the cost function is at the minimum), the parameters are provided to the model at block 218, and the optimization of the model ends in block 220. The model can then output the location and geometric dimensions of the source of florescence to be used for further processing (e.g., used by a surgeon to cut out a tumor with minimal resection of healthy tissue).

Those having ordinary skill in the art will recognize that numerous modifications can be made to the specific implementations described above. The implementations should not be limited to the particular limitations described. Other implementations may be possible.

The invention claimed is:

1. A system for identifying a source of fluorescence in tissue, comprising:
   a light source configured to be shone on a subject, the light source configured to illuminate tissue of a subject at a first wavelength, and in response cause emission of light at a second wavelength from a source of fluorescence;
   an optical filter configured to filter out light having the first wavelength and allow passage of light having the second wavelength;
   an image capture device configured to capture images of the tissue at the second wavelength; and
   a processor having software encoded on a non-transitory computer readable medium configured to:
      capture at least one 2 dimensional (2D) image of a subject having a plurality of pixels;
      establish information about approximate location in the captured 2D image of the source of fluorescence within the tissue of the subject;
      identify a region of the interest about the approximate location of the source of fluorescence;
      establish a 3 dimensional (3D) topography data of the subject at least about the region of interest;
      map each pixel of the region of interest of the at least one captured 2D image to the 3D topography data;
      selectively generate a 3D geometric model based on a plurality of parameters including optical parameters of the tissue as well as the mapped pixels of the region of interest on the 3D topography data, wherein the 3D geometric model outputs a modeled 2D image representation of the at least one 2D captured image;
      compare the modeled 2D image representation to the at least one captured 2D image and generate an error signal representing a difference therebetween;
      iteratively adjust the plurality of parameters of the 3D geometric model to minimize the error signal; and
      output a location and a geometric configuration with respect to the 3D geometric model of the source of fluorescence within the tissue within the region of interest.

2. The system of claim 1, wherein establishment of the 3D topography data is based on laser scanning.

3. The system of claim 1, wherein establishment of the 3D topography data is based on stereoscopic image acquisition.

4. The system of claim 3, the stereoscopic image acquisition using at least two image capture devices.

5. The system of claim 1, wherein the image capture device is a charge coupled device, or a plurality of photodiodes.

6. The system of claim 1, wherein the establishment of information about approximate location in the captured 2D image of a tumor is by causing the tumor to fluoresce.

7. The system of claim 1, the establishment of information about the approximate location of the source of fluorescence is by analyzing scattered light initially shone from the light source.

8. The system of claim 1, the establishment of information about the approximate location of the source of fluorescence is by analyzing absorption of light initially shone from the light source.

9. The system of claim 1, wherein the light source is a laser light.

10. The system of claim 9, wherein the laser light is spread using a light spreader.

11. A method for identifying a source of fluorescence in tissue, comprising:
- shining a light on a subject by a light source at a first wavelength, causing emission of light at a second wavelength from a source of fluorescence;
- optically filtering out light at the first wavelength and allowing passage of light at the second wavelength;
- capturing at least one 2 dimensional (2D) image of a subject having a plurality of pixels at the second wavelength;
- establishing information about approximate location in the captured 2D image of the source of fluorescence within the tissue of the subject;
- identifying a region of the interest about the approximate location of the source of fluorescence;
- establishing a 3 dimensional (3D) topography data of the subject at least about the region of interest;
- mapping each pixel of the region of interest of the at least one captured 2D image to the 3D topography data;
- selectively generating a 3D geometric model based on a plurality of parameters including optical parameters of the tissue as well as the mapped pixels of the region of interest on the 3D topography data, wherein the 3D geometric model outputs a modeled 2D image representation of the at least one 2D captured image;
- comparing the modeled 2D image representation to the at least one captured 2D image and generate an error signal representing a difference therebetween;
- iteratively adjusting the plurality of parameters of the 3D geometric model to minimize the error signal; and
- outputting a location and a geometric configuration with respect to the 3D geometric model of the source of fluorescence within the tissue within the region of interest.

12. The method of claim 11, wherein establishment of the 3D topography data is based on laser scanning.

13. The method of claim 11, wherein establishment of the 3D topography data is based on stereoscopic image acquisition.

14. The method of claim 13, the stereoscopic image acquisition uses at least two image capture devices.

15. The method of claim 11, wherein the image capture device is a charge coupled device, or a plurality of photodiodes.

16. The system of claim 1, wherein the establishment of information about approximate location in the captured 2D image of a tumor is by causing the tumor to fluoresce.

17. The system of claim 1, the establishment of information about the approximate location of the source of fluorescence is by analyzing scattered light initially shone from the light source.

18. The system of claim 1, the establishment of information about the approximate location of the source of fluorescence is by analyzing absorption of light initially shone from the light source.

19. The system of claim 1, wherein the light source is a laser light.

20. The method of claim 19, wherein the laser light is spread using a light spreader.

* * * * *